United States Patent
Gallucci et al.

(10) Patent No.: US 8,492,474 B2
(45) Date of Patent: *Jul. 23, 2013

(54) METHODS OF MAKING POLYMER BLEND COMPOSITIONS

(75) Inventors: Robert Russell Gallucci, Mt. Vernon, IN (US); Tara J. Mullen, Plymouth, MN (US); Roy Ray Odle, Mt. Vernon, IN (US); Kapil Chandrakant Sheth, Evansville, IN (US); James Mitchell White, Niskayuna, NY (US)

(73) Assignee: Sabic Innovative Plastics IP B.V. (NL)

( * ) Notice: Subject to any disclaimer, the term of this patent is extended or adjusted under 35 U.S.C. 154(b) by 549 days.

This patent is subject to a terminal disclaimer.

(21) Appl. No.: 12/099,809

(22) Filed: Apr. 9, 2008

(65) Prior Publication Data

US 2009/0099300 A1    Apr. 16, 2009

Related U.S. Application Data

(63) Continuation-in-part of application No. 11/562,628, filed on Nov. 22, 2006, now Pat. No. 8,268,934.

(51) Int. Cl.
| | |
|---|---|
| *C08L 67/00* | (2006.01) |
| *C08L 71/02* | (2006.01) |
| *C08L 77/00* | (2006.01) |
| *C08L 77/12* | (2006.01) |
| *C08L 79/06* | (2006.01) |
| *C08L 81/04* | (2006.01) |
| *C08L 81/06* | (2006.01) |

(52) U.S. Cl.
USPC ........... 524/538; 525/397; 525/417; 525/420; 525/425; 525/432; 525/436; 525/535; 525/537

(58) Field of Classification Search
USPC ................. 525/397, 417, 420, 425, 432, 436, 525/535, 537; 524/538
See application file for complete search history.

(56) References Cited

U.S. PATENT DOCUMENTS

| | | | |
|---|---|---|---|
| 3,383,092 A | 5/1968 | Cazier | |
| 3,671,487 A | 6/1972 | Abolins | |
| 3,723,373 A | 3/1973 | Lucas | |
| 3,972,902 A | 8/1976 | Heath et al. | |
| 4,154,775 A | 5/1979 | Axelrod | |
| 4,455,410 A | 6/1984 | Giles, Jr. | |
| 4,468,506 A * | 8/1984 | Holub et al. | ................... 525/432 |
| 4,835,249 A | 5/1989 | Gallagher et al. | |
| 4,910,288 A | 3/1990 | Dellacoletta | |
| 5,079,309 A | 1/1992 | Harris et al. | |
| 5,091,028 A | 2/1992 | Yamazaki et al. | |
| 5,171,796 A | 12/1992 | Harris et al. | |
| 5,331,063 A | 7/1994 | Pater et al. | |
| 5,633,319 A | 5/1997 | Silvi et al. | |
| 5,705,574 A | 1/1998 | Lubowitz | |
| 6,187,874 B1 * | 2/2001 | Yoshioka et al. | ............. 525/423 |
| 2005/0070684 A1 | 3/2005 | Gallucci et al. | |
| 2007/0066740 A1 | 3/2007 | Odle et al. | |

FOREIGN PATENT DOCUMENTS

| | | |
|---|---|---|
| EP | 1498909 A1 | 1/2005 |
| WO | WO 2006/091481 A * | 8/2006 |

OTHER PUBLICATIONS

J. A. Kreuz, et al., and J. Poly. Sci. Part A-1, vol. 4, pp. 2067-2616 (1966).
Y. J. Kim, et al., Macromolecules, vol. 26, pp. 1344-1358 (1993).
K. P. Chan et al., Macromolecules, vol. 27, p. 6731 (1994) and J. S. Chao, Polymer Bull., vol. 17, p. 397 (1987).
JP08239645 Abstract; Sep. 17, 1996; 1 page.
JP58007449 Abstract; Jan. 17, 1983; 1 page.
Chao, "NMR Study of ploy(phenylene oxide) (PPO)(1) resin's hydroxyl end groups"; Polymer Bulletin 17; 1987; pp. 397-401.
JP408143667A with Abstract; Published Jun. 4, 1996; 10 pages.
International Search Report for International Application No. PCT/US2007/075809; Mailed Jan. 7, 2008; 5 pages.
Written Opinion for International Application No. PCT/US2007/075809; Mailed Jan. 7, 2008; 6 pages.
International Search Report for International Application No. PCT/US2007/075812; Mailed May 7, 2008; 5 pages.
Written Opinion for International Application No. PCT/US2007/075812; Mailed May 7, 2008; 5 pages.
International Search Report for International Application No. PCT/US2007/075993; Mailed Nov. 13, 2007; 5 pages.
Written Opinion for International Application No. PCT/US2007/075993; Mailed Nov. 13, 2007; 6 pages.

* cited by examiner

*Primary Examiner* — Ana Woodward
(74) *Attorney, Agent, or Firm* — Cantor Colburn LLP; Diderico van Eyl

(57) ABSTRACT

Methods of making miscible and compatible immiscible polymer blends are disclosed. The polymer blends have a polyimide as a component. The miscible polymer blends have a single glass transition temperature. The compatible polymer blends have two glass transition temperatures. The polymer blends may optionally include one or more fillers.

22 Claims, 1 Drawing Sheet

METHODS OF MAKING POLYMER BLEND COMPOSITIONS

RELATED APPLICATIONS

This application is continuation-in-part of U.S. patent application Ser. No. 11/562,628, filed Nov. 22, 2006, now U.S. Pat. No. 8,268,934 which is hereby incorporated by reference in its entirety as though set forth in full.

BACKGROUND OF THE INVENTION

Compositions having a polymer blend and methods of making them are disclosed herein.

Polymer blends are widely employed in a range of applications. For example, substitution of metal parts with parts made from plastic materials (polymer compositions) results in parts having lighter weight and similar or improved performance properties. In many applications, such as parts used under an automobile hood, plastic materials with a high heat resistance are required. Frequently though, plastic materials having a high heat resistance are difficult to mold. Blending polymers is one approach to achieving a plastic material with a desired set of physical properties such as high heat resistance and processability. Polymer blends may comprise miscible polymers, immiscible polymers, or a combination of miscible and immiscible polymers. Blends comprising immiscible polymers have two or more phases and such blends may be compatible or incompatible. Incompatible blends of immiscible polymers can suffer from phase separation as demonstrated by delamination or the formation of skin-core layered structures during polymer processing operations, especially injection molding. The term, "delamination," as used when referring to such materials, describes visually observed separation of a surface layer giving a flaking or onion skin effect. Incompatibility may also result in poor mechanical properties and marginal surface appearance (streaking, pearlescence, etc.). Compatible blends of immiscible polymers typically do not show any delamination and can result in acceptable end-use properties.

Miscible polymer blends, on the other hand, may offer desirable end-use properties and the advantage of tailoring product properties intermediate of the individual components across the miscible composition range. Miscible blends do not suffer from delamination and generally have consistent physical properties.

So while a miscible blend of two polymers is generally desirable it can be difficult to achieve. Blends of two polymers of a same or similar class might be expected to have a better chance of miscibility. However, polymers from the same class are frequently immiscible and form multiphasic compositions. For example, ACUDEL 2000 from Solvay is an immiscible blend of two polysulfones—PPSU and PSU. In addition, many such examples of immiscible blends of polymers in the same class exist in the literature. Thus, polymer miscibility is difficult to predict, even within the same class of polymers.

For the foregoing reasons there remains an unmet need for non-delaminated polymer blends, i.e., blends free of delamination, which are either miscible blends or immiscible, but nonetheless compatible, blends. More particularly, there remains an unmet need to develop blends having high heat resistance, and methods of forming such polymer blends.

BRIEF DESCRIPTION OF THE INVENTION

The invention includes methods of making thermoplastic compositions comprising a non-delaminated polymer blend. The blend may include, in optional embodiments, one or more fillers. In one embodiment a method of making a polymer blend comprises melt mixing a pre-polymer and a polymer. In another embodiment a method of making a polymer blend comprises melt mixing a pre-polymer, a polymer and at least one filler. The pre-polymer has a component selected from the group consisting of free amine groups, free anhydride groups, and combinations thereof; and comprises structural units derived from a dianhydride and a diamine. The polymer comprises a reactive member selected from the group consisting of structural groups, end groups, and combinations thereof. The reactive member is reactive with the free anhydride groups, the free amine groups, or combinations thereof. The filler is selected from fillers that do not substantially dissipate under higher temperatures. The polymer blend is non-delaminated.

In some embodiments the method comprises using a polymer comprising structural units derived from a dianhydride and a diamine. In some embodiments the pre-polymer and polymer employ a common diamine or dianhydride. When the pre-polymer and polymer employ a common diamine or dianhydride the polymer blend may have a predetermined glass transition temperature, provided that the pre-polymer and polymer are present in amounts sufficient to provide a blend having the selected glass transition temperature.

In some embodiments the method comprises using a pre-polymer and a polymer derived from different diamines and dianhydrides. When the pre-polymer and polymer are derived from different diamines and dianhydrides the polymer blend may have more than one predetermined glass transition temperature.

In some embodiments a method of making a composition comprises forming a polymer blend by melt mixing a pre-polymer and a polymer and then melt mixing the polymer blend with an additional component. The pre-polymer comprises a component selected from the group consisting of free amine groups, free anhydride groups, and combinations thereof and comprising structural units derived from a dianhydride and a diamine. The polymer comprises a reactive member selected from the group consisting of structural groups, end groups, and combinations thereof. The reactive member is reactive with the free anhydride groups, the free amine groups, or combinations thereof.

In other embodiments a method of making a composition comprises forming a polymer blend by melt mixing a pre-polymer and a polymer and then melt mixing the polymer blend with an additional component and at least one filler. The pre-polymer comprises a component selected from the group consisting of free amine groups, free anhydride groups, and combinations thereof and comprising structural units derived from a dianhydride and a diamine. The polymer comprises a reactive member selected from the group consisting of structural groups, end groups, and combinations thereof. The reactive member is reactive with the free anhydride groups, the free amine groups, or combinations thereof. The filler is selected from fillers that do not substantially dissipate under higher temperatures.

DETAILED DESCRIPTION OF THE INVENTION

Figure 1:
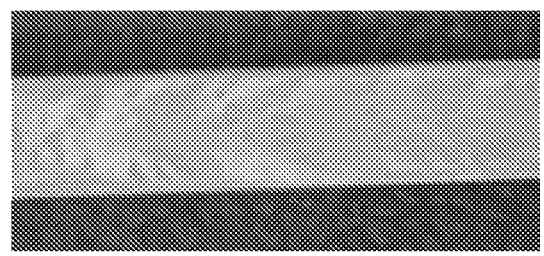
FIG. 1 is a photograph of a sample showing delamination.

The invention is based on the unexpected discovery that it is now possible to form non-delaminated compositions that are derived from (a) pre-polymers having free amine groups and/or free anhydride groups and (b) a polymers having structural groups and/or end groups that are reactive with the pre-polymer's free anhydride groups and/or free amine groups. Surprisingly, the compositions (and articles derived from the compositions) can overcome the problem of delamination typically found in immiscible, incompatible blends. Compositions (and articles derived from the compositions) can also exhibit improved miscibility and increase the range of miscible blend compositions.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The terms "first," "second," and the like, "primary," "secondary," and the like, "(a)," "(b)" and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The definition of benzylic proton is well known in the art, and as used herein it encompasses at least one aliphatic carbon atom chemically bonded directly to at least one aromatic ring, such as a phenyl or benzene ring, wherein said aliphatic carbon atom additionally has at least one proton directly bonded to it.

As used herein "substantially free of benzylic protons" or "essentially free of benzylic protons" means that the pre-polymer, such as for example a polyimide sulfone pre-polymer, has less than about 5 mole % of structural units, in some embodiments less than about 3 mole % structural units, and in other embodiments less than about 1 mole % structural units derived containing benzylic protons. "Free of benzylic protons," which are also known as benzylic hydrogens, means that the pre-polymer contains zero mole % of structural units derived from monomers and end cappers containing benzylic protons or benzylic hydrogens. The amount of benzylic protons can be determined by ordinary chemical analysis based on the chemical structure. In one embodiment the polymer blend is essentially free of benzylic protons.

The term "alkyl" is intended to include both $C_{1-30}$ branched and straight-chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" is intended to mean an aromatic moiety containing the specified number of carbon atoms, such as, but not limited to phenyl, tropone, indanyl or naphthyl.

All ASTM tests are based on the 2003 edition of the Annual Book of ASTM Standards unless otherwise indicated.

The term "polymer blend" as used herein means a macroscopically homogeneous mixture of two or more different polymers. The term "miscible blend" describes a polymer blend having a single glass transition temperature ($T_g$) and a monophasic resin morphology as determined by transmission electron microscopy at a magnification of fifteen thousand (15,000). "Delamination" describes the separation of a surface layer from the body of an article molded from a polymer composition. The presence or absence of delamination can be determined by visual inspection (20/20 vision) at a distance of one half (½) meter as described in greater detail below.

A "compatible" polymer blend is an immiscible polymer blend that exhibits macroscopically uniform physical properties throughout its whole volume, has more than one glass transition temperature ($T_g$), and shows multiphasic resin morphologies when viewed by electron microscopy as described above, but shows no delamination.

The term "non-delaminated" refers to the property of a composition or an article derived from the composition, in which the article or the composition does not exhibit visually observed separation of a surface layer showing a flaking or onion skin effect. A non-delaminated article may also be referred to herein as "essentially free from delamination."

Figure 2:
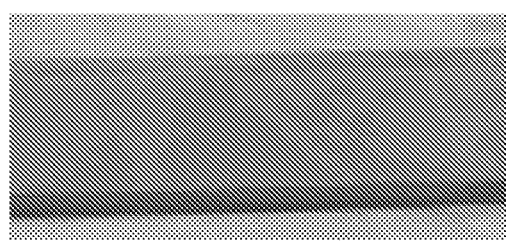
FIG. 2 is a photograph of a sample essentially free from delamination.

"Essentially free from delamination" is defined as showing no delamination by visual inspection. In one embodiment, the specimen used for inspection is an injection molded bar. A specimen showing delamination is shown in FIG. 1. A specimen essentially free from delamination is shown in FIG. 2. "Visual inspection" is determined by unaided vision (e.g., 20/20 vision in the absence of any magnifying device with the exception of corrective lenses necessary for normal eyesight) at a distance of one half (½) meter.

The "pre-polymer" is an incompletely imidized oligomer comprising structural units derived from a dianhydride and a diamine. Exemplary dianhydrides have the formula (I)

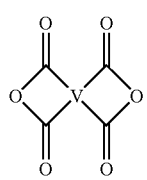

wherein V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of formula (II), such as:

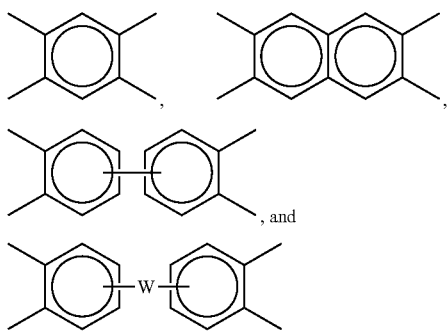
(II)

wherein W is a divalent moiety such as —O—, —S—, —C(O)—, —SO$_2$—, —SO—, —C$_y$H$_{2y}$— (y being an integer of 1 to 20), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited to, divalent moieties of formula (III).

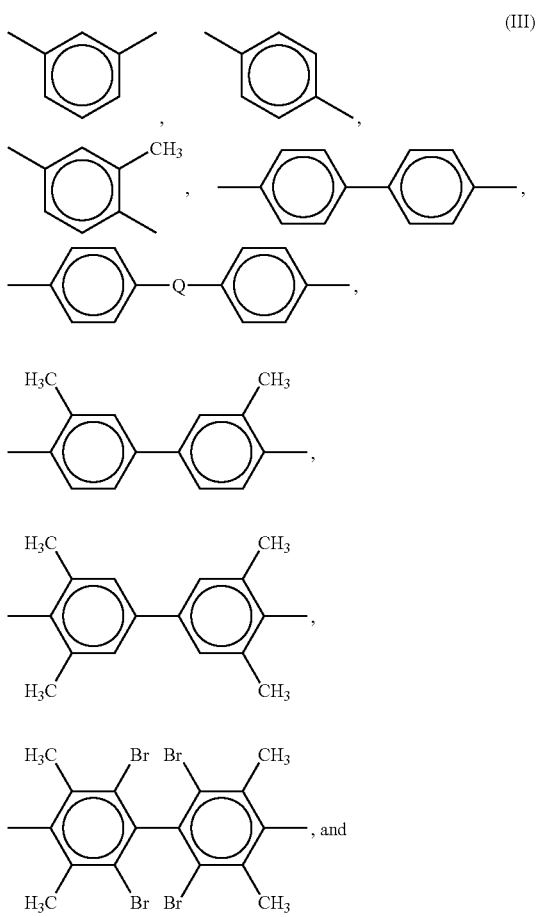
(III)

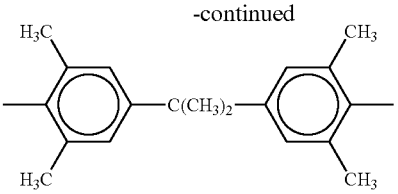

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker V is free of halogens. In some embodiments groups free of benzylic protons are used as the resulting pre-polymer (as well as the polymer blend) can have superior melt stability.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride(bisphenol-A dianhydride); 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing. In one embodiment the dianhydride is selected from the group consisting of oxydiphthalic anhydrides, bisphenol-A dianhydrides and combinations thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

A chemical equivalent to a dianhydride may also be used. Examples of dianhydride chemical equivalents include tetrafunctional carboxylic acids capable of forming a dianhydride and ester or partial ester derivatives of the tetra functional carboxylic acids. Mixed anhydride acids or anhydride esters may also be used as an equivalent to the dianhydride. As used throughout the specification and claims "dianhydride" will refer to dianhydrides and their chemical equivalents.

Useful diamines have the formula:

(IV)

wherein R$^{10}$ is a substituted or unsubstituted divalent organic moiety such as: an aromatic hydrocarbon moiety having 6 to 20 carbons and halogenated derivatives thereof; straight or branched chain alkylene moiety having 2 to 20 carbons; cycloalkylene moiety having 3 to 20 carbon atom; or divalent moieties of the general formula (V)

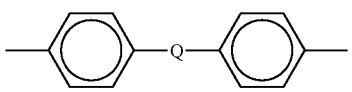

(V)

wherein Q is defined as above. Examples of specific organic diamines are disclosed, for example, in U.S. Pat. Nos. 3,972,902 and 4,455,410. Exemplary diamines include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl) toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis(3-aminopropyl)tetramethyldisiloxane. Mixtures of these compounds may also be used. In one embodiment the diamine is an aromatic diamine, or, more specifically, m-phenylenediamine, p-phenylenediamine, sulfonyl dianiline and mixtures thereof. In one embodiment the diamine is selected from the group consisting of diamino diaryl sulfones, metaphenylene diamines, paraphenylene diamines, and combinations thereof.

In some embodiments the pre-polymer is a polyetherimide pre-polymer comprising structural units derived from oxydiphthalic anhydride (ODPA) and diamino diaryl sulfone (DAS). Oxydiphthalic anhydride has the general formula (VI):

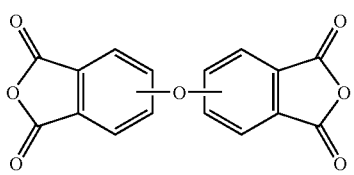

(VI)

and derivatives thereof as further defined below.

The oxydiphthalic anhydrides of formula (VI) includes 4,4'-oxybisphthalic anhydride, 3,4'-oxybisphthalic anhydride, 3,3'-oxybisphthalic anhydride, and any mixtures thereof. For example, the oxydiphthalic anhydride of formula (VI) may be 4,4'-oxybisphthalic anhydride having the following formula (VII):

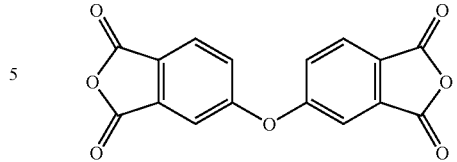

(VII)

The term oxydiphthalic anhydrides includes derivatives of oxydiphthalic anhydrides which may also be used to make the pre-polymer. Examples of oxydiphthalic anhydride derivatives which can function as a chemical equivalent for the oxydiphthalic anhydride in polyetherimide forming reactions include oxydiphthalic anhydride derivatives of the formula (VIII)

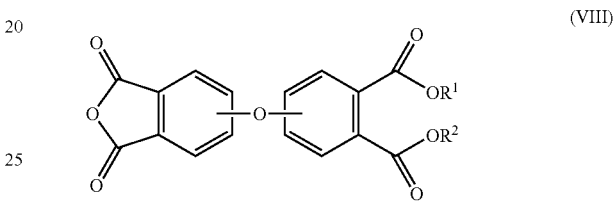

(VIII)

wherein $R^1$ and $R^2$ of formula VIII can be, independently at each occurrence, any of the following: hydrogen; a $C_1$-$C_8$ alkyl group; an aryl group. $R^1$ and $R^2$ can be the same or different to produce an oxydiphthalic anhydride acid, an oxydiphthalic anhydride ester, and an oxydiphthalic anhydride acid ester.

Derivatives of oxydiphthalic anhydrides may also be of the following formula (IX):

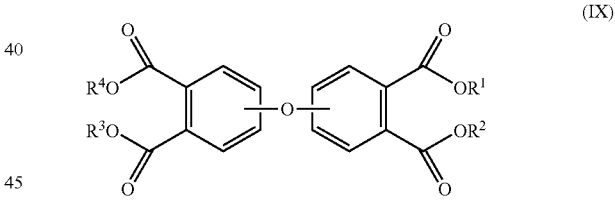

(IX)

wherein $R^1$, $R^2$, $R^3$, and $R^4$ of formula (IX) can be, independently at each occurrence, any of the following: hydrogen; a $C_1$-$C_8$ alkyl group, an aryl group. $R^1$, $R^2$, $R^3$, and $R^4$ can be the same or different to produce an oxydiphthalic acid, an oxydiphthalic ester, and an oxydiphthalic acid ester.

Diamino diaryl sulfones (DAS) have the general formula (X):

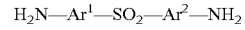

$$H_2N-Ar^1-SO_2-Ar^2-NH_2 \quad (X)$$

wherein $Ar^1$ and $Ar^2$ independently are an aryl group containing a single or multiple rings. Several aryl rings may be linked together, for example through ether linkages, sulfone linkages or more than one sulfone linkages. The aryl rings may also be fused. In one embodiment $Ar^1$ and $Ar^2$ independently comprise 5 to 12 carbons. In one embodiment $Ar^1$ and $Ar^2$ are both phenyl groups.

In one embodiment, the pre-polymer is an ODPA/DAS polyetherimide comprising more than 1, specifically 10 to 1000, or, more specifically, 30 to 500 structural units of formula (XI):

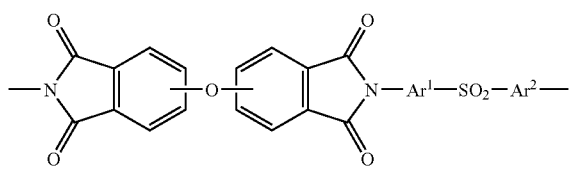

(XI)

wherein Ar¹ and Ar² are defined as above.

In one embodiment, the pre-polymer has a total reactive end group concentration of 0.5 to 20 mole % resin. Reactive end groups are defined as anhydrides and their chemical equivalents and amines. In some embodiments, a pre-polymer has a weight average molecular weight of 1,000 to 100,000 grams per mole (g/mole) as measured by gel permeation chromatography (GPC).

The pre-polymer can have different ratios of carbon (C) atoms to non-carbon atoms such as nitrogen (N), oxygen (O), and sulfur (S). For instance, in one embodiment, the pre-polymer can have a ratio of C atoms/N+O+S atoms of 2.8 to 4.2. In one embodiment, the number of oxygen atoms is greater than or equal to 2.5 times the number of nitrogen atoms. In another embodiment, the number of oxygen atoms is 2.5 to 5.0 times more than the number of nitrogen atoms. In another embodiment, the number of oxygen atoms is greater than or equal to 7 times the number of sulfur atoms. In another embodiment, the number of oxygen atoms is 7 to 10 times the number of sulfur atoms.

The pre-polymer may be made by any suitable process, such as the process described in U.S. Pat. No. 4,835,249. In this method, reactant monomers are dissolved in a solvent and then polymerized to an extent where the polymer precipitates from solution and can eventually be isolated by filtration or other related separation technique.

When the pre-polymer is an ODPA/DAS pre-polymer the pre-polymer is made using a slurry/precipitation method comprising stirring a diamine and a dianhydride in a solvent to form a slurry, heating the slurry to a temperature sufficient for the diamine and dianhydride to react wherein the temperature is below the melting point of the dianhydride, below the melting point of the diamine, or below the melting points of the dianhydride and diamine, and reacting the diamine and dianhydride to form a polyetherimide having sufficient molecular weight to precipitate from the solvent.

In the above process, it is important that the reaction temperature is kept below the melting point of the minimally soluble monomers so that the polymers precipitate as fine powder from the slurry that is easily stirred. It can be useful to remove water, or other volatile by-products from the reaction mixture by distillation or other means. In one embodiment azeotropic distillation of water is employed. In some embodiments water can be removed by chemical absorption using, for example, molecular sieves. In other instances water can be removed using a stream of a gas, for example nitrogen, passing over or through the reaction mixture. In addition, a combination of two or more water removal methods may be employed.

In one embodiment, the polymerization is conducted entirely below the melting point of the minimally soluble monomer(s). This may be useful when the boiling point temperature of the solvent and the melting point of the minimally soluble monomer(s) are greater than 100° C., to allow removal of water from the polymerization reaction at atmospheric pressure.

It can be useful to conduct the polymerization under pressure, for example at 1 to 300 pounds per square inch (psi) (21.1 kilograms force per square centimeter (kgf/cm²)), or, more specifically, 1 psi (0.070 kgf/cm²) to 100 psi (7.0 kgf/cm²). This can be done for a variety of reasons, one being to raise reaction temperature and increase the rate of imidization. In order to prevent sticking or clumping of the precipitated polymer it is still important to maintain temperature below the melting point of the minimally soluble monomer(s) even when pressure is increased. In some embodiments, it may be useful to remove water from the reaction while pressure is maintained at atmospheric pressure. In some embodiments it can be useful to remove water in a multi step process employing pressures greater than or equal to atmospheric pressure.

After the consumption of equal to or greater than 50 weight percent (wt %) of the initial charge of the monomers it can be useful in some embodiments to isolate the precipitated polymer. In other embodiments the precipitated polymer may be isolated when equal to or greater than 90 wt % of the initial charge of monomers are consumed. This can be done using a variety of methods, for example, filtration, centrifugation, floatation, freeze-drying, and combinations comprising one or more of the foregoing methods. In some embodiments equal to or greater than 95 wt % of the isolated precipitated polyetherimide, based on the total weight of the isolated precipitated polyetherimide, passes through a 2 millimeter (mm) mesh screen. In some embodiments the isolated precipitated polyetherimide is a free flowing powder with an average particle size of 10 to 5000 micrometers.

The solvent used to form the slurry is chosen such that one or more of the initial monomers is minimally soluble. "Minimally soluble" is defined as 1 to 50 wt % of the monomer is undissolved at the start of the reaction (at the initial reaction conditions). In addition, the solvent should be chosen such that the resultant polymer is largely insoluble, that is to have a polymer solubility of less than or equal to 10 wt %, or, even more specifically, less than or equal to 5 wt %, or, even more specifically, less than or equal to 1 wt %. In some embodiments the solvent comprises an aprotic polar solvent. In some embodiments, the solvent is insoluble in water, that is less than or equal to 5 wt %, or, more specifically, less than or equal to 1 wt %, based on the total amount of solvent, of the solvent dissolves in an equal amount of water at room temperature. In some embodiments, the solvent has a high auto ignition temperature, for example greater than or equal to 70° C., to reduce the potential fire hazard during the process and during any subsequent isolation.

In addition, a solvent free of nitrogen atoms, phosphorus atoms, sulfur atoms or a combination comprising two or more of the foregoing may be useful in some embodiments. Solvents without these more polar atoms may be easier to remove from the polymer and being less effective solvents are more likely to have monomers and polymers that are minimally soluble or insoluble.

Examples of useful solvents for forming the pre-polymer include halogenated aromatics, such as chlorobenzene, dichlorobenzene, trichlorobenzene and bromobenzene; aryl ethers such as phenetole, anisole and veratrole; alkylaromatics such as xylenes and toluene; nitro aromatics such as nitrobenzene; polyaryl species such as naphthylene and alkyl substituted fused aromatic systems; aryl sulfone; high molecular weight alkane compounds such as mineral oils; and combinations comprising one or more of the foregoing solvents. In some embodiments the solvent or combination of solvents has an atmospheric boiling point of 150 to 250° C.

The reaction to form the pre-polymer may be run at any level of reactants versus solvent. In some instances the weight % solids can be 5 to 50% by weight of reactants to solvent at the start of the polymerization reaction. In other instances, concentrations of 15 to 40% by weight may be useful. In still other instances higher concentrations of reactants to solvent may be used to gain reactor efficiency.

Polyetherimide pre-polymer may be made using the precipitative process by reaction of more or less equal molar amounts of dianhydride (or chemical equivalent of a dianhydride) with a diamine. In some embodiments the amount of dianhydride and diamine differ by less than 5 mole %; this helps to give polymers of sufficient molecular weight (Mw), for example greater than or equal to 1,000 g/mol, to precipitate from the reaction medium and have useful mechanical properties such as stiffness, impact strength and resistance to tearing or cracking.

Polyetherimide polymers and pre-polymers may have varying levels of amine and anhydride end groups depending on the amounts of diamine and dianhydride used in the polymerization reaction and the degree of completeness of the polymerization reaction. A variety of amine, anhydride, and anhydride derivatives such as carboxylic acids, carboxylate salts, amide-acids and amide-carboxylate salts are examples of possible end groups. As used herein it will be understood that the term "amine end groups" comprises end groups that are amines, and any related end groups that are derived from amine end groups. As used herein it will also be understood that the term "anhydride end groups" comprises end groups which are anhydrides and anhydride derivatives such as carboxylic acid, carboxylate salts, amide-acids and amide-carboxylate salts. All types, more than one type or essentially one type of these end groups may be present. In general, total reactive end group concentrations of a polyetherimide can be 0.05 to 0.3 mole % resin. In contrast, the total reactive end group concentrations of a pre-polymer can be 0.5 to 20 mole %. As used herein, the term "reactive end group" refers to any of the various possible end groups that can give rise to volatile species during melt processing. Most reactive end groups will be amine or anhydride. In one embodiment, the pre-polymer has a total reactive end group content of 1 to 10 mole %, or, more specifically, 5 to 10 mole %.

The concentration of amine, anhydride, and related end groups can be analyzed by various titration and spectroscopic methods well known in the art. Spectroscopic methods include infrared, nuclear magnetic resonance, Raman spectroscopy, and fluorescence. Examples of infrared methods are described in J. A. Kreuz, et al., and J. Poly. Sci. Part A-1, vol. 4, pp. 2067-2616 (1966). Examples of titration methods are described in Y. J. Kim, et al., Macromolecules, vol. 26, pp. 1344-1358 (1993). It may be advantageous to make derivatives of polymer end groups to enhance measurement sensitivity using, for example, variations of methods as described in K. P. Chan et al., Macromolecules, vol. 27, p. 6731 (1994) and J. S. Chao, Polymer Bull., vol. 17, p. 397 (1987).

The molecular weight of pre-polymer can be measured by gel permeation chromatography (GPC). The molecular weights as used here refer to the weight average molecular weight (Mw). In one embodiment, the pre-polymer has a weight average molecular weight of 1,000 to 100,000 grams per mole (g/mole) as measured by gel permeation chromatography (GPC). In some embodiments the Mw can be 2,000 to 20,000.

The polymer comprises end groups reactive with anhydride, amine or a combination thereof under melt mixing conditions. Exemplary endgroups include and are not limited to amine, anhydride, hydroxyl, alcohol, amide, epoxide, ester, thiol, acid and activated aromatic halide, and combinations thereof. Exemplary polymers include polyimides, polyetherimides, polyamideimides, polyaryl ether ketones, polyaryl ketones, polyether ketones, polyether ether ketones, polyaryl sulfones, liquid crystal polymers, polyamides, polyesters, polysulfones, polyphenylene sulfides, polybenzimidazoles, polyphenylenes, and combinations thereof. The foregoing exemplary polymers are commercially available e.g., Aurum polyimides (Mitsui), ULTEM polyetherimides (GE), PEEK (Victrex), Radel polysulfones (Solvay) and Fortron PPS (Ticona).

The polymer may be a polyetherimide derived from the dianhydrides and diamines described above. In some embodiments the dianhydride(s) used in making the pre-polymer and/or polymer is selected from the group consisting of oxydiphthalic anhydride, bisphenol-A dianhydride, and combinations thereof. In some embodiments the diamine(s) used in making the pre-polymer and/or polymer is selected from the group consisting of diamino diaryl sulfones, metaphenylene diamines, paraphenylene diamines and combinations thereof. In some embodiments, the polymer is a polyetherimide comprising structural units derived from bisphenol-A dianhydride (BPADA) and diamino diarylsulfone (DAS). Bisphenol-A dianhydride has the following formula (XII):

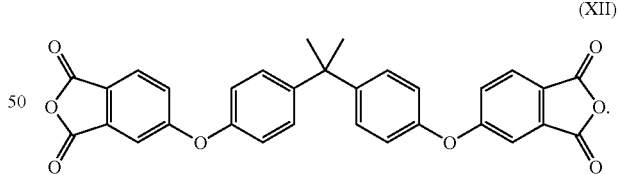

(XII)

Similar to the discussion above with regard to oxydiphthalic anhydride, the term "bisphenol-A dianhydride" is inclusive of chemical derivatives of the anhydride functionality which can function as a chemical equivalent for the bisphenol-A dianhydride in polyetherimide forming reactions.

In one embodiment the diamino diaryl sulfone is diamino diphenyl sulfone.

In one embodiment, the polymer is a BPADA/DAS polyetherimide comprising more than 1, or, specifically 10 to 1000, or, more specifically, 30 to 500 structural units of the formula (XIII):

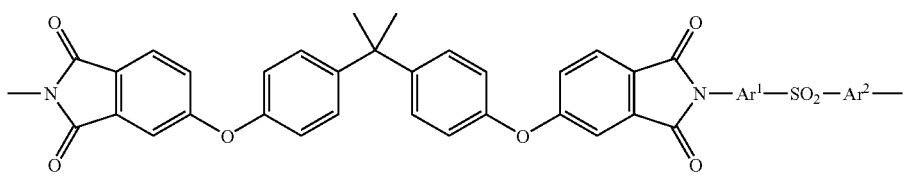

(XIII)

The polyetherimide can have a weight average molecular weight (Mw) of 5,000 to 100,000 grams per mole (g/mole) as measured by gel permeation chromatography (GPC). In some embodiments the Mw can be 10,000 to 80,000.

In some embodiments the polymer is a polyetherimide derived from bisphenol-A dianhydride (BPADA) and phenylene diamine (PD) (a BPADA/PD polyetherimide). More specifically, the structural units can be derived from bisphenol-A dianhydride (BPADA) and meta-phenylene diamine (MPD), BPADA and para-phenylene diamine (PPD), or combinations thereof.

Meta-phenylene diamine (MPD) has the following formula (IX):

(IX)

Para-phenylene diamine (PPD) has the following formula (XI):

(XI)

The BPADA/PD polyetherimide comprises more than 1, or, specifically 10 to 1000, or, more specifically, 30 to 500 structural units of the formula (X), formula (XII) or a combination thereof:

the resultant polymers can be used. Solvents such as dimethyl formamide (DMF), dimethyl acetamide (DMAC), N-methylpyrrolidinone (NMP), hexamethyl phosphoramide (HMPA) and dimethyl sulfoxide (DMSO) can be used in this method. The resultant polymers are totally dissolved and can be isolated from solution by removal of solvent as part of a film casting or other evaporative process or by precipitation using an anti-solvent such as methanol.

In addition to the components of the resin blend, the filled compositions of the present invention also include at least one filler. The filler is selected based upon one or more chosen properties and/or uses of the filled compositions. For example, if it is desired to include a colorant, one or more colorants, dyes, pigments or the like may be included. Alternatively, or in addition thereto, if flame retardancy is desired, one or more flame retardant materials may also be included in the filled compositions. The amount and/or type of filler added may vary based upon one or more factors including, but not limited to, the selected characteristic or characteristics of the filled composition, the amount and/or type of the resins in the resin blend, the type of article to be made using the filled composition and/or the type of process used to make the filled composition and/or the article to be made.

In another aspect, in beneficial embodiments, the fillers do not substantially dissipate under higher temperatures. Accordingly, the fillers used in the present invention have, in one embodiment, a weight loss (under nitrogen) of 10% or less at 300 C, as determined by thermal gravimetric analyses (TGA); ASTM method E1868. In another embodiment, the fillers used in the present invention have a weight loss (under nitrogen) of 5% or less at 300 C, as determined by thermal gravimetric analyses (TGA); ASTM method E1868.

Accordingly, the filled compositions of the invention include one or more fillers selected from glass fillers and

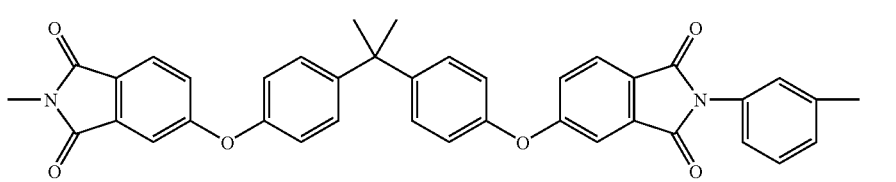

(X)

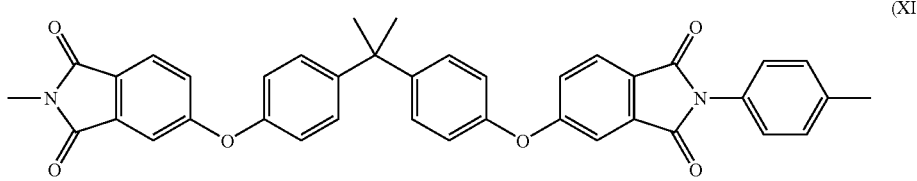

(XII)

In embodiments where the polymer is a polyetherimide, the polyetherimide may be made using any suitable method known in the art. In one embodiment, a method using a highly polar solvent that dissolves both the reactant monomers and fibers; carbon fillers and fibers; aramid fillers and fibers; metallic fillers and fibers; metal-coated fibers; natural fillers and fibers; minerals; stabilizers; colorants; nanofillers and nanofibers; lubricants; impact modifiers; flame retardants;

mold release agents; processing aids; coupling agents; high specific gravity materials; and blends and/or mixtures including one or more of the foregoing fillers.

In one embodiment, the filler is a reinforcing agent or fiber. Suitable fillers or reinforcing agents include, for example, $TiO_2$; fibers, such as asbestos, carbon fibers, or the like; silicates and silica powders, such as aluminum silicate (mullite), synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper, tungsten and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, hemp, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations including at least one of the foregoing fillers or reinforcing agents. One or more of these fillers may be added from 1 to 98% by weight of the total composition, excluding any filler. In another embodiment, one or more of these fillers may be added from 1 to 70% by weight of the total composition, excluding any filler.

A particularly suitable embodiment of fillers includes reinforcing fibers such as glass, ceramic and carbon and are generally well known in the art, as are their methods of manufacture. In one embodiment, glass is particularly suitable, especially glass that is relatively soda free. Fibrous glass filaments comprised of lime-alumino-borosilicate glass, which is also known as "E" glass are often especially suitable. Glass fiber is added to the composition to increase the flexural modulus and strength. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns are required with a diameter of from 10-15 microns being preferred. In preparing the molding compositions it is convenient to use the fiber in the form of chopped strands of from about ⅛" (3 mm) to about ½" (13 mm) long although roving may also be used. In articles molded from the compositions, the fiber length is typically shorter presumably due to fiber fragmentation during compounding of the composition. The length of such short glass fibers present in final molded compositions is less than about 4 mm. The fibers may be treated with a variety of coupling agents to improve adhesion to the resin matrix. Preferred coupling agents include; amino, epoxy, amide or mercapto functionalized silanes. Organo metallic coupling agents, for example, titanium or zirconium based organo metallic compounds, may also be used. Other preferred sizing-coated glass fibers are commercially available from Owens Corning Fiberglass as, for example, OCF K filament glass fiber 183F.

In another embodiment, long glass fibers can be used, wherein a continuous glass fiber bundle containing glass fiber monofilaments having a diameter in the range, 10-24 μm, preferably 13-18 μm is impregnated with a melted thermoplastic. After cooling, the impregnated bundle is cut into pellets having a length of >5 mm, preferably, above >9 mm. These pellets can be incorporated into the compositions of the invention, to get long fiber glass reinforced polyester compositions. The length of long glass fiber present in molded composition prepared by this method is typically greater than that prepared by incorporation of short fibers and the predominant portion of the long glass fibers present have a length >4 mm in the molded part. Such long fiber glass reinforced compositions can be used for different molding techniques such as injection molding, compression molding, thermoforming and the like. As in the case of short fibers, the long fibers may also be treated with a variety of coupling agents to improve adhesion to resin. For those skilled in the art, a continuous process such as pultrusion technique for direct incorporation of long glass fibers in compositions will also be possible.

In another embodiment, the filler is an impact modifier. Suitable impact modifiers include an elastomer-modified graft copolymer including (i) an elastomeric (i.e., rubbery) polymer substrate having a Tg below 0° C., more specifically from −40° to −80° C., and (ii) a rigid polymeric superstrate grafted to the elastomeric polymer substrate. As is known, elastomer-modified graft copolymers may be prepared by first providing an elastomeric polymeric backbone. At least one grafting monomer, and in alternative embodiments two monomers, are then polymerized in the presence of the polymer backbone to obtain the graft copolymer.

In another embodiment the impact modifier has a core-shell structure wherein the core is an elastomeric polymer substrate and the shell is a rigid thermoplastic polymer that is readily wet by the polycarbonate. The shell may merely physically encapsulate the core, or the shell may be partially or essentially completely grafted to the core. More specifically, the shell comprises the polymerization product of a monovinylaromatic compound and/or a monovinylic monomer or an alkyl (meth)acrylate.

The amount of impact modifiers added to the thermoplastic compositions of the present invention may be based on the selected impact characteristics of the compositions as well as molded articles made from these compositions. In one embodiment, the impact modifier is present in amounts of up to 25 wt. %. In another embodiment, the impact modifier is present in amounts from 1 to 20 wt. %. In still another embodiment, the impact modifier is present in amounts from 5 to 15 wt. %.

Impact modifiers with good thermal stability may be preferred in some instances. In a beneficial embodiment, impact modifiers that do not substantially dissipate or decompose under higher temperatures are preferred. Accordingly, the impact modifiers used in the present invention have, in one embodiment, a weight loss (under nitrogen) of 10% or less at 250 C, as determined by thermal gravimetric analyses (TGA); ASTM method E1868. In another embodiment, the impact modifiers used in the present invention have a weight loss (under nitrogen) of 10% or less at 300 C, as determined by thermal gravimetric analyses (TGA); ASTM method E1868.

In still another embodiment, the composition may include a lubricant. Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 40 parts by weight, based on 100 parts by weight of the total composition, excluding any filler.

In yet another embodiment, the composition may includes a heat stabilizer. Suitable heat stabilizers include, for example, organo phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 10 parts by weight based on 100 parts by weight of the total composition, excluding any filler.

In still another embodiment, the composition may include a UV absorber. Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 10 parts by weight, based on 100 parts by weight based on 100 parts by weight of the total composition, excluding any filler.

In yet another embodiment, the composition includes a pigment. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 0.01 to 20 parts by weight, based on 100 parts by weight based on 100 parts by weight of the total composition, excluding any filler.

In still another embodiment, the composition includes a dye. Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.01 to 20 parts by weight, based on 100 parts by weight of the total composition, excluding any filler. Colorants that are not fugitive from the polymer melt above 300 C are preferred as are colorants with a molecular weight above 500 daltons.

In yet another embodiment, the composition includes a colorant. Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.01 to 20 parts by weight, based on 100 parts by weight of the total composition, excluding any filler.

In still another embodiment, the composition includes a blowing agent. Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

In yet another embodiment, the composition includes a mold release agent. Suitable mold releasing agents include for example, stearyl stearate, pentaerythritol tetrastearate, beeswax, montan wax, paraffin wax, or the like, or combinations including at least one of the foregoing mold release agents. Mold releasing agents are generally used in amounts of from 0.1 to 10 parts by weight, based on 100 parts by weight of the total composition, excluding any filler.

In still another embodiment, the composition includes a material to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated. Low molecular weight hydrocarbon resins are generally used in amounts of from 0.1 to 10 parts by weight, based on 100 parts by weight of the total composition, excluding any filler.

In yet another embodiment, the composition includes a flame retardant. Suitable flame retardants include a phosphorus containing flame retardant, for example an organic phosphates and/or an organic compound containing phosphorus-nitrogen bonds. One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl) phosphate, bis (2-ethylhexyl)p-tolyl phosphate, tritolyl phosphate, bis(2-ethylhexyl) phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

In some instances it maybe desired to have flame retardant compositions that are essentially free of halogen atoms, especially bromine and chlorine. "Essentially free of chlorine and bromine" as used herein refers to materials produced without the intentional addition of chlorine, bromine, and/or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to 100 parts per million by weight (ppm), less than or equal to 75 ppm, or less than or equal to 50 ppm. When this definition is applied to the fire retardant it is based on the total weight of the fire retardant. When this definition is applied to the thermoplastic composition it is based on the total weight of the composition, excluding any filler.

Optionally, inorganic flame retardants may also be used, for example sulfonate salts such as potassium perfluorobutane sulfonate (Rimar salt) and potassium diphenylsulfone sulfonate; salts formed by reacting for example an alkali metal or alkaline earth metal (preferably lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, $BaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of from 0.01 to 1.0 parts by weight, more specifically from 0.05 to 0.5 parts by weight, based on 100 parts by weight of the total composition, excluding any filler.

In another embodiment, the filler is a nanofiller, such as a nanotube or nanofiber. Suitable nanofillers include carbon nanotubes. In one embodiment, the carbon nanotubes are single-wall nanotubes while in an alternative embodiment; the carbon nanotubes are multi-wall nanotubes. Other suitable nanofillers that may be used in the present invention include, but are not limited to, nanoclays, nano-alumina and the like.

In still other embodiments, the composition includes one or more smoke suppressants such as metal borate salts for example zinc borate, alkali metal or alkaline earth metal borate or other borate salts. Additionally other of boron containing compounds, such as boric acid, borate esters, boron oxides or other oxygen compounds of boron may be useful. Additionally other flame retardant additives, such as aryl phosphates and brominated aromatic compounds, including polymers containing linkages made from brominated aryl compounds, may be employed. Examples of halogenated aromatic compounds, are brominated phenoxy resins, halogenated polystyrenes, halogenated imides, brominated polycarbonates, brominated epoxy resins and mixtures thereof.

In still other embodiments, the composition may also optionally include a fluoropolymer in an amount of 0.01 to 5.0% fluoropolymer by weight of the composition. The fluoro polymer may be used in any effective amount to provide anti-drip properties to the resin composition. Some possible examples of suitable fluoropolymers and methods for making such fluoropolymers are set forth, for example, in U.S. Pat. Nos. 3,671,487, 3,723,373 and 3,383,092. Suitable fluoropolymers include homopolymers and copolymers that include structural units derived from one or more fluorinated alpha-olefin monomers. The term "fluorinated alpha-olefin monomer" means an alpha-olefin monomer that includes at least one fluorine atom substituent. Some of the suitable fluorinated alpha-olefin monomers include, for example, fluoro ethylenes such as, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Some of the suitable fluorinated alpha-olefin copolymers include copolymers including structural units derived from two or more fluorinated alpha-olefin monomers such as, for example, poly(tetrafluoro ethylene-hexafluoro ethylene), and copolymers including structural units derived from one or more fluorinated monomers and one or more non-fluorinated monoethylenically unsaturated monomers that are copolymerizable with the fluorinated monomers such as, for example, poly(tetrafluoroethylene-ethylene-propylene) copolymers. Suitable non-fluorinated monoethylenically unsaturated monomers include for example, alpha-olefin monomers such as, for example, ethylene, propylene, butene, acrylate monomers such as for example, methyl methacrylate, butyl acrylate, and the like, with poly(tetrafluoroethylene) homopolymer (PTFE) preferred.

Polymer additives may also be employed in the blends described herein. In some cases a metal oxide may be added to the polymers of the present invention. In some instances the metal oxide may further improve flame resistance (FR) performance by decreasing heat release and increasing the time to peak heat release. Titanium dioxide is of note. Other metal oxides include zinc oxides, boron oxides, antimony oxides, iron oxides and transition metal oxides. Metal oxides that are white may be desired in some instances. Metal oxides may be used alone or in combination with other metal oxides. Metal oxides may be used in any effective amount, in some instances at from 0.01 to 20 wt % of the polymer blend.

In beneficial embodiments of the present invention, the lubricant, heat stabilizer, UV absorber, pigment, dye, colorant, mold release agent, flow promoter, flame retardant additive, smoke suppressant, polymer additive or the like, is a material capable of withstanding the higher processing temperatures capable of being achieved using the compositions of the present invention. In one embodiment, these additives when used in the filled compositions of the present invention have a molecular weight of 500 daltons or greater. In another embodiment, the additives used in the filled compositions of the present invention have a molecular weight of 600 daltons or greater. In still another embodiment, the filler or fillers used in the filled compositions of the present invention have a molecular weight of 700 daltons or greater.

Polymer blends used in articles according to the present invention may also include various additives such as nucleating, clarifying, stiffness and/or crystallization rate agents. These agents are used in a conventional matter and in conventional amounts.

The filled polymer blends used in articles according to the present invention may be blended with the aforementioned ingredients by a variety of methods involving intimate admixing of the materials with any additional additives desired in the formulation. A beneficial procedure includes melt blending, although solution blending is also possible. Because of the availability of melt blending equipment in commercial polymer processing facilities, melt-processing methods are generally utilized. Illustrative examples of equipment used in such melt processing methods include: co-rotating and counter-rotating extruders, single screw extruders, co-kneaders, disc-pack processors and various other types of extrusion equipment.

In another embodiment, the compositions may further include second polymer. Examples of such polymers include and are not limited to PPSU (polyphenylene sulfone), PEI (poly(ether imide)), PSU (polysulfone), PC (polycarbonate), PPE (polyphenylene ether), PMMA (poly methyl methacrylate), ABS (acrylonitrile butadiene styrene), PS (polystyrene), PVC (polyvinylchloride), PFA (per fluoro aalkoxy alkane), MFA (co-polymer of TFE tetra fluoro ethylene and PFVE perfluorinated vinyl ether), FEP (Fluorinated ethylene propylene polymers), PPS (poly(phenylene sulfide), PEK (poly(ether ketone), PEEK (poly(ether-ether ketone), ECTFE (ethylene chloro trifluoro ethylene), PVDF (polyvinylidene fluoride), PTFE (polytetrafluoroethylene), PET (polyethylene terephthalate), POM (polyacetal), PA (polyamide), UHMW-PE (ultra high molecular weight polyethylene), PP (polypropylene), PE (polyethylene), HDPE (high density polyethylene), LDPE (low density polyethylene), PBI (polybenzimidizole), PAI (poly(amide-imide), poly(ether sulfone), poly(aryl sulfone), polyphenylenes, polybenzoxazoles, polybenzthiazoles, as well as blends and co-polymers thereof.

Compositions may be made by any suitable method. For instance, compositions can be made by melt mixing (compounding) the pre-polymer, the polymer and, optionally, additives, in a suitable device such as twin screw extruder at a suitable temperature, e.g., 250° C. to 450° C. Melt mixing is performed by mixing the composition components at a temperature sufficient to maintain the pre-polymer and the polymer in a molten state. The temperature is less than the degradation temperatures of the pre-polymer and the polymer. In some embodiments an extruder is used for melt mixing. Optionally, the extruder may have a vacuum vent. In some embodiments the pre-polymer and the polymer are melt mixed to form the polymer blend and additional components are added to the polymer blend. The polymer blend may be pelletized and then the polymer blend pellets melt mixed with additional components, or the additional components may be added to the polymer blend without a pelletizing step.

The pre-polymer may be present in an amount of 1 weight percent (wt %) to 99 wt %, or, more specifically, 10 wt % to 90 wt %, or, even more specifically, 20 wt % to 80 wt %, based on the combined weight of the pre-polymer and the polymer. The polymer may be present in an amount of 1 wt % to 99 wt %, or, more specifically, 10 wt % to 90 wt %, or, even more specifically, 20 wt % to 80 wt %, based on the combined weight of the pre-polymer and the polymer.

The compositions of the invention can be formed into articles by any number of methods. Preferred methods include, for example, injection molding, blow molding, compression molding, profile extrusion, sheet or film extrusion, sintering, gas assist molding, structural foam molding and thermoforming. Film and sheet extrusion processes may include and are not limited to melt casting, blown film extrusion and calendering. Examples of such articles include, but are not limited to, films, membranes, tubing, composites, semi-conductor process tools, wire coatings and jacketing, fluid handling components, cookware, food service items, medical devices, trays, plates, handles, helmets, animal cages, electrical connectors, enclosures for electrical equipment, engine parts, automotive engine parts, bearings, lighting sockets and reflectors, electric motor parts, power distribution equipment, communication equipment, computers and the like, including devices that have molded in snap fit connectors. The blends can also be used as fibers. In addition the blends can be used as coatings, for example powder coatings.

Films may have a thickness of 0.1 to 1000 micrometers in some instances. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow coating. Film and sheet may alternatively be prepared by casting a solution or suspension of the composition in a suitable solvent onto a substrate, belt or roll followed by removal of the solvent. Films may also be metallized using standard processes such as sputtering, vacuum deposition and lamination with foil.

Oriented films may be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction Compositions discussed herein may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1) Providing a single or multi-layer thermoplastic substrate having optionally one or more colors on the surface, for instance, using screen printing of a transfer dye.

2) Conforming the substrate to a mold configuration such as by forming and trimming a substrate into a three dimensional shape and fitting the substrate into a mold having a surface which matches the three dimensional shape of the substrate.

3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles. Accordingly, another embodiment of the invention relates to articles, sheets and films prepared from the compositions above.

The physical properties of the compositions, and articles derived from the compositions, are useful and can vary. For instance, in embodiments where the pre-polymer and the polymer comprise a common diamine, the polymer blend can have a single resin glass transition temperature.

When the polymer blend has a single glass transition temperature, the glass transition temperature can be greater than or equal to 100° C., or, more specifically, greater than or equal to 125° C., or, even more specifically, greater than or equal to 150° C. The glass transition temperature can be less than or equal to 600° C.

In embodiments where the pre-polymer and the polymer do not have a common monomer the compatible polymer blend has greater than one glass transition temperature. In some embodiments the composition has two glass transition temperatures. In some embodiments the lowest glass transition temperature is greater than or equal to 50° C., or, more specifically, greater than or equal to 75° C., or, even more specifically, greater than or equal to 100° C. The lowest glass transition temperature can be less than or equal to 600° C.

In some embodiments the polymer blend has a melt viscosity of 50 to 20,000 Pascal-seconds at 380° C. as measured by ASTM method D3835 using a capillary rheometer with a shear rate of 100 to 10,000 l/sec. Within this range the melt viscosity can be greater than or equal to 100, or, more specifically, greater than or equal to 200. Also within this range the melt viscosity can be less than or equal to 15,000, or, more specifically, less than or equal to 10,000 Pascal-seconds.

In another embodiment, the composition (and articles made from the composition) can have heat deflection temperature (HDT) of greater than or equal to 100° C., according to ASTM D648. In one embodiment, compositions can have an HDT ranging of 100° C. to 400° C., according to ASTM D648. In another embodiment, the compositions, and articles derived from the compositions, can have a tensile strength of greater than or equal to 70 megaPascals (MPa) according to ASTM D638. In one embodiment, the compositions and articles can have a tensile strength of 70 MPa to 500 MPa. The coefficient of thermal expansion of the compositions can vary. In one embodiment, the coefficient of thermal expansion is less than 100 ppm/° C. from 30° C.-200° C. as measured by thermal mechanical analysis with a thermal ramp rate of 5° C./minute. In another embodiment, the coefficient of thermal expansion is 5 to 100 ppm/° C. from 30° C.-200° C. as measured by thermal mechanical analysis with a thermal ramp rate of 5° C./minute.

Compositions and articles derived from the compositions can also exhibit advantageous heat aging performance properties. For instance, in one embodiment, a composition (and articles derived from the composition) can have a continuous use temperature of greater than or equal to 150° C., or above. A composition can have a continuous use temperature of 150° C. to 400° C.

Advantageously, the compositions described herein now provide previously unavailable compositions and articles. For instance, the compositions can overcome the problem of delamination in an immiscible, incompatible blends and exhibit immiscible, but compatible blend features having highly useful applications. The compositions can provide a much wider range of miscible blend compositions. Compositions of the invention can exhibit an improved visual transparent appearance. Extending the range of miscibility in such blends has significant practical importance. It is now possible to make a wide variety of blend compositions with a single glass transition temperature (Tg) and pre-determined transparency.

The following examples are included to provide additional guidance to those skilled in the art. The examples provided are merely representative and are not intended to limit the invention, as defined in the appended claims, in any manner.

EXAMPLES

Materials used in the Examples are listed Table 1. Amounts listed in the Examples are in weight percent based on the combined weight of the first and second polymers used.

TABLE 1

| | |
|---|---|
| PEI 1 (ODPA/DAS) | A polyetherimide comprising structural units derived from oxydiphthalic anhydride and diamino diphenyl sulfone and having a molecular weight of 30,000 g/mol. |
| PEI 2 (BPADA/DDS) | A polyetherimide comprising structural units derived from bisphenol-A dianhydride and diamino diphenyl sulfone and having a molecular weight of 38,000 g/mol. This polymer is commercially available from GE Plastics under the tradename ULTEM XH6050. |
| PEI 3 (BPADA/MPD) | A polyetherimide comprising structural units derived from bisphenol-A dianhydride and meta-phenylene diamine and having a molecular weight of 38,000 g/mol. This polymer is commercially available from GE Plastics under the tradename ULTEM 1000. |
| Pre-Polymer (ODPA/DAS) | A polyetherimide comprising structural units derived from oxydiphthalic anhydride and diamino diphenyl sulfone, having a weight average molecular weight of 15,000 g/mol and a total reactive end group content of 14 mole %. |

Results

TABLE 2

| | Ex. 1 | Ex. 2 | Ex. 3 | Ex. 4* |
|---|---|---|---|---|
| Pre-Polymer (ODPA/DDS) | 85 | 75 | 60 | — |
| PEI 1 (ODPA/DDS) | — | — | — | 85 |
| PEI 3 (BPADA/MPD) | 15 | 25 | 40 | 15 |
| $T_g$ | 2 | 2 | 2 | 2 |
| Morphology | Two-Phase | Two-Phase | Two-Phase | Two-Phase |
| Appearance | Opaque | Opaque | Opaque | Opaque |
| Delamination on Heat Aging | No | No | No | Yes |

*Comparative example

TABLE 3

| | Ex. 5 | Ex. 6 | Ex. 7 | Ex. 8* | Ex. 9* |
|---|---|---|---|---|---|
| Pre-Polymer (ODPA/DDS) | 85 | 75 | 60 | — | — |
| PEI 1 (ODPA/DDS) | — | — | — | 85 | 60 |
| PEI 2 (BPADA/DDS) | 15 | 25 | 40 | 15 | 40 |
| $T_g$ | 1 | 1 | 1 | 2 | 2 |
| Morphology | One-Phase | One-Phase | One-Phase | Two-Phase | Two-Phase |
| Appearance | Transparent | Transparent | Transparent | Translucent | Translucent |
| Delamination on Heat Aging | No | No | No | No | No |

*Comparative examples

Examples 1-9

The purpose of these examples is to show that blending with a reactive pre-polymer can overcome the problem of delamination in an immiscible, incompatible blend. These examples also show that blending with a reactive pre-polymer can improve the miscibility in an immiscible, but compatible blend and result in a much wider range of miscible blend compositions. The examples also show how visual appearance can also improve.

Preparation Techniques

The compositions shown in Table 2 were prepared by melt mixing the components in a twin screw extruder at temperatures of 300° C. to 430° C. with vacuum venting. The screw speed typically varied from 100 to 350 rotations per minute (RPM).

Testing Techniques

The compositions were tested for glass transition temperature using differential scanning calorimetry (DSC). Morphology was determined by visual inspection using ASTM tensile bars. The tensile bars were aged at 280° C. for 240 hours and checked for delamination by visual inspection. Visual inspection was determined by normal vision (e.g., 20/20 vision in the absence of any magnifying device with the exception of corrective lenses necessary for normal eyesight) at a distance of one half (½) meter. Results are shown in Tables 2 and 3.

Discussion

Examples 1-3 (which are based on pre-polymers) when compared to Comparative Example 4 (which is not based on a pre-polymer) show the unexpected behavior of polyetherimide blends when a pre-polymer was used to make the blends. Blends of PEI 1 and PEI 3 exhibited two phase morphology and delamination even at low levels of PEI 3 (15 weight %). In contrast, despite the two phase resin morphology, blends of pre-polymer and PEI 3, even at 40 weight %, did not show delamination after heat aging at 280° C. for 240 hours. Surprisingly, melt mixing with a reactive pre-polymer overcame the problem of delamination in an immiscible, incompatible blend and resulted in an immiscible, but compatible blend of practical importance.

Examples 5-7 (which are based on pre-polymers) when compared to Comparative Examples 8 and 9 (which are not based on pre-polymers) illustrated the unexpected behavior of polyetherimide blends when a pre-polymer was used to make the blends. Blends of PEI 1 and PEI 2 showed two phase morphology at low levels of PEI 2 (15 weight %). Despite the multiphasic resin morphology, the blends of PEI 1 and PEI 2 did not show any delamination. In contrast, blends of pre-polymer and PEI 2 showed a monophasic morphology with a single Tg at the same levels of PEI 2 (15 weight %) and even at a high level of PEI 2 (40 weight %). No delamination after heat aging at 280° C. for 240 hours was observed in any of these blends.

The blend of Example 7 also demonstrated excellent properties. More particularly, the blend of Example 7 exhibited tensile strength of 120 MPa, flexural strength of 170 MPa, HDT of 240° C. under a load of 1.8 MPa, and a coefficient of thermal expansion of 45 ppm/° C. from 30-200° C.

Thus, Examples 5-7 showed that blending with a reactive pre-polymer improved the miscibility in an immiscible, but compatible blend and resulted in a much wider range of miscible blend compositions. The visual appearance also improved from translucent to transparent. Extending the range of miscibility in such a blend has significant practical importance since a wide variety of blend compositions with a single Tg and transparency could now be designed.

While the invention has been described with reference to several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims. All patents identified by number herein are incorporated by reference in their entirety.

What is claimed:

1. A method of making a polymer blend comprising:
   melt mixing
   (a) a pre-polymer having a component selected from the group consisting of free amine groups, free anhydride groups, and combinations thereof said pre-polymer being an incompletely imidized oligomer having a weight average molecular weight of 2,000 to 20,000 grams/mole and a total reactive end group concentration of 0.5 to 20 mole %, comprising structural units derived from a dianhydride and a diamine,
   (b) a polymer having a weight average molecular weight of 10,000 to 80,000 grams/mole and a total reactive end group concentration of from 0.05 to 0.3 mole %, comprising a reactive member reactive with the pre-polymer's free anhydride groups, free amine groups, or combinations thereof and wherein the polymer blend is non-delaminated; and
   (c) from 1 to 98 wt. % of at least one filler;
   wherein the pre-polymer is present in an amount of 1 weight percent to 98 weight percent, based on the combined weight of the pre-polymer and the polymer and the polymer is present in an amount of 1 weight percent to 98 weight percent, based on the combined weight of the pre-polymer and the polymer, and
   wherein the at least one filler and all of the polymer components have a weight loss (under nitrogen) of 10% or less at 300° C., as determined by thermal gravimetric analyses ASTM method E1868.

2. The method of claim 1, wherein the dianhydride is oxydiphthalic anhydride and the diamine is a diamino diaryl sulfone.

3. The method of claim 1, wherein the polymer is selected from the group consisting of polyimides, polyetherimides, polyamideimides, polyaryl ether ketones, polyaryl ketones, polyether ketones, polyether ether ketones, polyaryl sulfones, liquid crystal polymers, polyamides, polyesters, polysulfones, polyphenylene sulfides, polybenzimidazoles, and combinations of two or more of the foregoing.

4. The method of claim 1, wherein the pre-polymer is present in an amount of 20 weight percent to 79 weight percent, based on the combined weight of the pre-polymer and the polymer and the polymer is present in an amount of 20 weight percent to 79 weight percent, based on the combined weight of the pre-polymer and the polymer.

5. The method of claim 1, wherein the pre-polymer has a ratio of carbon atoms/(nitrogen atoms+oxygen atoms+sulfur atoms) of 2.8 to 4.2.

6. The method of claim 1, wherein the filler is selected from the group consisting of glass fillers, carbon fillers, aramid fillers, metallic fillers, metal-coated fibers, natural fillers, and nanofillers; and the composition optionally further comprises minerals; stabilizers; colorants; lubricants; impact modifiers; flame retardants; mold release agents; processing aids; coupling agents; and blends and/or mixtures including two or more of the foregoing.

7. A method of making a polymer blend comprising:
   melt mixing
   (a) a pre-polymer comprising a component selected from the group consisting of free amine groups, free anhydride groups, and combinations thereof said pre-polymer being an incompletely imidized oligomer having a weight average molecular weight of 2,000 to 20,000 grams/mole and a total reactive end group concentration of 0.5 to 20 mole %, further comprising structural units derived from a first dianhydride and a first diamine;
   (b) a polymer having a weight average molecular weight of 10,000 to 80,000 grams/mole and a total reactive end group concentration of from 0.05 to 0.3 mole %, comprising a reactive member reactive with the pre-polymer's free anhydride groups, free amine groups, or combinations thereof and said polymer further comprising structural units derived from a second dianhydride and a second diamine; and
   (c) from 1 to 98 wt. % of at least one filler;
   wherein the first dianhydride is the same as the second dianhydride or the first diamine is the same as the second diamine, and the other is different,
   wherein the pre-polymer is present in an amount of 1 weight percent to 98 weight percent, based on the combined weight of the pre-polymer and the polymer and the polymer is present in an amount of 1 weight percent to 98 weight percent, based on the combined weight of the pre-polymer and the polymer, and
   wherein the at least one filler and all of the polymer components have a weight loss (under nitrogen) of 10% or less at 300 C, as determined by thermal gravimetric analyses ASTM method E1868.

8. The method of claim 7, wherein the first dianhydride and the second anhydride is independently selected from the group consisting of oxydiphthalic anhydrides, bisphenol-A dianhydrides, and combinations thereof.

9. The method of claim 7, wherein the first diamine and the second diamine is independently selected from the group consisting of diamino diaryl sulfones, metaphenylene diamines, paraphenylene diamines, and combinations thereof.

10. The method of claim 7, wherein the pre-polymer is present in an amount of 20 weight percent to 79 weight percent, based on the combined weight of the pre-polymer and the polymer and the polymer is present in an amount of 20 weight percent to 79 weight percent, based on the combined weight of the pre-polymer and the polymer.

11. The method of claim 7, wherein the pre-polymer comprises structural units derived from oxydiphthalic anhydrides and diamino diaryl sulfones and the polymer comprises structural units derived from bisphenol-A dianhydrides and diamino diaryl sulfones.

12. The method of claim 7, wherein the pre-polymer has a ratio of carbon atoms/(nitrogen atoms+oxygen atoms+sulfur atoms) of 2.8 to 4.2.

13. The method of claim 7, wherein the filler is selected from the group consisting of glass fillers, carbon fillers, aramid fillers, metallic fillers, metal-coated fibers, natural fillers, and nanofillers; and the composition optionally further comprises minerals; stabilizers; colorants; lubricants; impact modifiers; flame retardants; mold release agents; processing aids; coupling agents; and blends and/or mixtures including two or more of the foregoing.

14. A method of making a polymer blend comprising:
melt mixing
 a. a pre-polymer comprising a component selected from the group consisting of free amine groups, free anhydride groups, and combinations thereof said pre-polymer being an incompletely imidized oligomer having a weight average molecular weight of 2,000 to 20,000 grams/mole and a total reactive end group concentration of 0.5 to 20 mole %, further comprising structural units derived from a first dianhydride and a first diamine;
 b. a polymer having a weight average molecular weight of 10,000 to 80,000 grams/mole and a total reactive end group concentration of from 0.05 to 0.3 mole %, comprising structural units derived from a second dianhydride and a second diamine; and
 c. from 1 to 98 wt. % of at least one filler;
  wherein the first dianhydride is different from the second dianhydride and the first diamine is different from the second diamine,
  wherein the pre-polymer is present in an amount of 1 weight percent to 98 weight percent, based on the combined weight of the pre-polymer and the polymer and the polymer is present in an amount of 1 weight percent to 98 weight percent, based on the combined weight of the pre-polymer and the polymer, and
  wherein the at least one filler and all of the polymer components have a weight loss (under nitrogen) of 10% or less at 300 C, as determined by thermal gravimetric analyses ASTM method E1868.

15. The method of claim 14, wherein the first dianhydride or the second anhydride is selected from the group consisting of oxydiphthalic anhydrides, bisphenol-A dianhydrides, and combinations thereof.

16. The method of claim 14, wherein the first diamine or the second diamine is selected from the group consisting of diamino diaryl sulfones, metaphenylene diamines, paraphenylene diamines, and combinations thereof.

17. The method of claim 14, wherein the pre-polymer is present in an amount of 20 weight percent to 79 weight percent, based on the combined weight of the pre-polymer and the polymer and the polymer is present in an amount of 79 weight percent to 80 weight percent, based on the combined weight of the pre-polymer and the polymer.

18. The method of claim 14, wherein the pre-polymer has a ratio of carbon atoms/(nitrogen atoms+oxygen atoms+sulfur atoms) of 2.8 to 4.2.

19. The method of claim 14, wherein the filler is selected from the group consisting of glass fillers, carbon fillers, aramid fillers, metallic fillers, metal-coated fibers, natural fillers, and nanofillers; and the composition optionally further comprises minerals; stabilizers; colorants; lubricants; impact modifiers; flame retardants; mold release agents; processing aids; coupling agents; and blends and/or mixtures including two or more of the foregoing.

20. A method of making a polyimide polymer blend having a predetermined glass transition temperature comprising:
 selecting a glass transition temperature for the blend; and
 melt mixing a pre-polymer, a polymer and at least one filler,
 wherein the pre-polymer and polymer are present in amounts sufficient to provide a blend having the selected glass transition temperature,
 wherein the pre-polymer comprises a component selected from the group consisting of free amine groups, free anhydride groups, and combinations thereof said pre-polymer being an incompletely imidized oligomer having a weight average molecular weight of 2,000 to 20,000 grams/mole and a total reactive end group concentration of 0.5 to 20 mole %, further comprising structural units derived from a first dianhydride and a first diamine,
 wherein the polymer has a weight average molecular weight of 10,000 to 80,000 grams/mole and a total reactive end group concentration of from 0.05 to 0.3 mole %, and comprises a reactive member reactive with the pre-polymer's free anhydride groups, free amine groups, or combinations thereof,
 wherein the polymer comprises structural units derived from a second dianhydride and a second diamine,
 wherein the first dianhydride is the same as the second dianhydride or the first diamine is the same as the second diamine, and the other is different, and
 wherein the at least one filler and all of the polymer components have a weight loss (under nitrogen) of 10% or less at 300 C, as determined by thermal gravimetric analyses ASTM method E1868.

21. The method of claim 20, wherein the pre-polymer has a ratio of carbon atoms/(nitrogen atoms+oxygen atoms+sulfur atoms) of 2.8 to 4.2.

22. A method of making a polyimide polymer blend having a predetermined glass transition temperature comprising:
 selecting a glass transition temperature for the blend; and
 melt mixing a pre-polymer, a polymer and at least one filler,
 wherein the pre-polymer and polymer are present in amounts sufficient to provide a blend having the selected glass transition temperature,
 wherein the pre-polymer comprises a component selected from the group consisting of free amine groups, free anhydride groups, and combinations thereof said pre-polymer being an incompletely imidized oligomer having a weight average molecular weight of 2,000 to 20,000 grams/mole and a total reactive end group concentration of 0.5 to 20 mole %, further comprising structural units derived from a first dianhydride and a first diamine,
 wherein the polymer has a weight average molecular weight of 10,000 to 80,000 grams/mole and a total reactive end group concentration of from 0.05 to 0.3 mole %, and comprises a reactive member reactive with the pre-polymer's free anhydride groups, free amine groups, or combinations thereof,
 wherein the polymer comprises structural units derived from a second dianhydride and a second diamine,
 wherein the first dianhydride is different from the second dianhydride and the first diamine is different from the second diamine, and
  wherein the at least one filler and all of the polymer components have a weight loss (under nitrogen) of 10% or less at 300 C, as determined by thermal gravimetric analyses ASTM method E1868.

* * * * *